Figure 1:
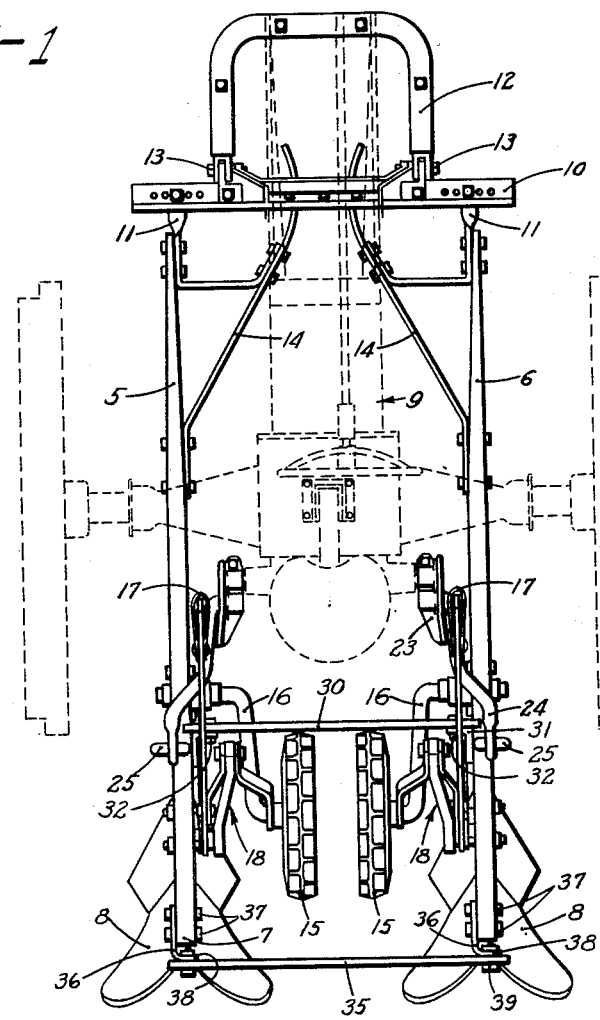

Dec. 6, 1938.  W. H. SILVER  2,139,042

TRACTOR MOUNTED IMPLEMENT

Filed April 10, 1937  2 Sheets-Sheet 1

INVENTOR
WALTER H. SILVER
BY
ATTORNEYS.

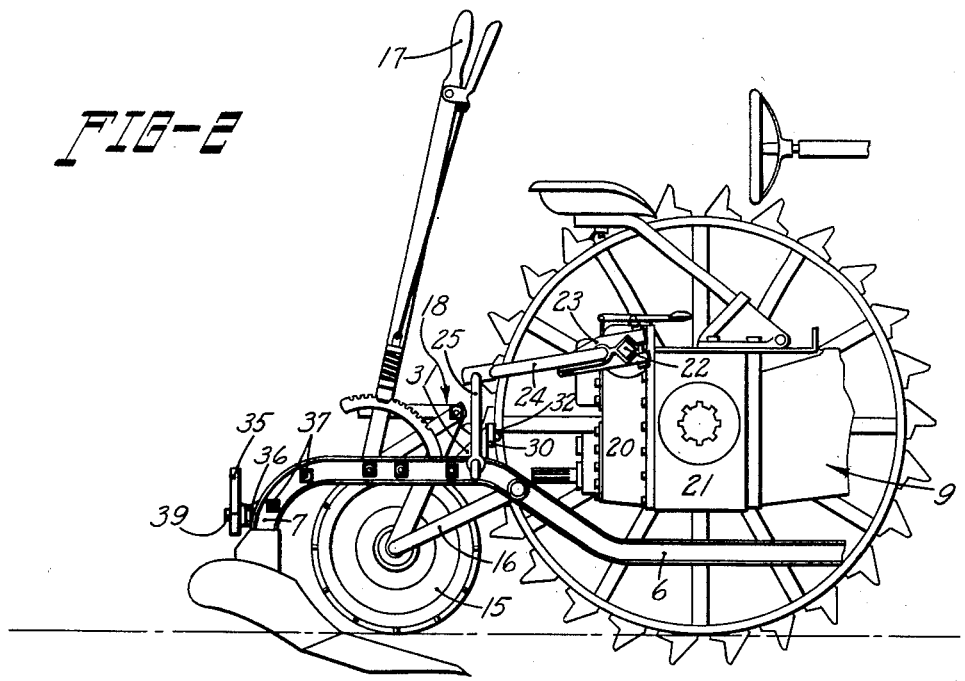
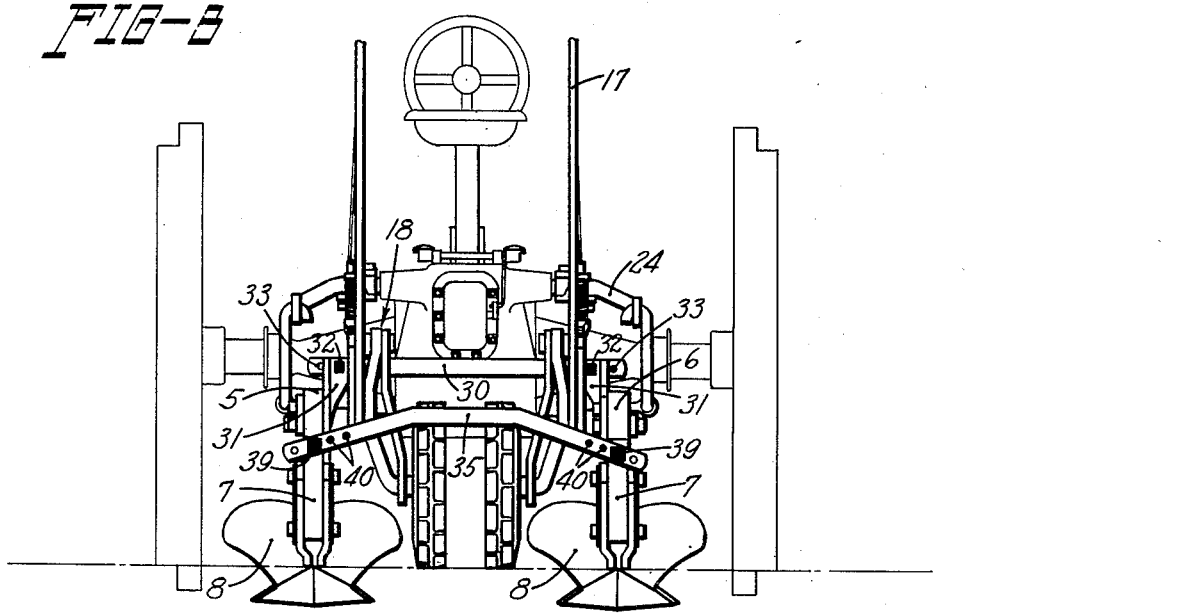

Patented Dec. 6, 1938

2,139,042

UNITED STATES PATENT OFFICE 2,139,042

TRACTOR MOUNTED IMPLEMENT

Walter H. Silver, Moline, Ill., assignor to Deere & Company, Moline, Ill., a corporation of Illinois Application April 10, 1937, Serial No. 136,136

10 Claims. (Cl. 97—47)

The present invention relates to tractor-mounted implements of the type comprising a pair of ground working, tool carrying beams disposed beneath the tractor and extending from a draft connection near the forward end of the tractor to the ground working tools behind the tractor, the draft connections of the beams being adapted to provide some independent vertical swinging of the beams relative to the tractor and to each other. Heretofore it has been the practice to interconnect the two beams by a transverse bracing member disposed behind the tractor but substantially forward of the rear ends of the beams. While this brace was sufficient to maintain the implement beams in parallel relation, there was a tendency for the beams to twist about their longitudinal axes and also to bend laterally due to the ground working tools being offset from the beams at the ends of downwardly extending shanks of appreciable length. Even a small amount of bending or twisting of the beams throws the lister bottom out of alignment, thereby causing the latter to cut through the soil at a slight angle to the forward movement of the implement, giving a cumulative tendency for the lister bottom to steer to one side or the other and greatly increasing the draft thereon.

The principal object of the present invention is concerned with reinforcing the rear ends of the tool beams against these lateral and torsional displacements, without appreciably affecting the independent vertical swinging movement of the beams. In the accomplishment of this object I have provided a second transversely extending bracing member interconnecting the beams, which is offset from the above mentioned bracing member both longitudinally and vertically. The longitudinal offset effects a reinforcement of the beams against lateral bending, while the vertical offset reinforces the beams against twisting. Since each of the bracing members is pivotally connected at each end to the beams for pivotal movement in a vertical plane, the braces do not appreciably restrain the tool beams from independent vertical swinging movement. This and other objects will be made apparent by consideration of the following description taken in conjunction with the appended drawings, in which Figure 1 is a plan view of a two-row tractor mounted listing plow embodying the principles of my invention, in which the position of the tractor is outlined in broken lines;

Figure 2 is a partial side elevation showing the rear portion of the tractor and the associated listing plow, the right rear wheel of the tractor being removed to more clearly illustrate the principles of the invention; and Figure 3 is a rear elevation of the tractor and lister.

Referring to the drawings, the lister comprises a pair of laterally spaced beams 5, 6, each beam having a downwardly turned shank 7, at the lower end of which is attached a lister bottom 8. The beams 5, 6 are positioned beneath a tractor 10 indicated generally by the reference numeral 9 with the lister bottoms 8 disposed behind the tractor and the beams 5, 6 extending forwardly to a transverse draft member 10 near the forward end of the tractor. The forward ends of the beams 5, 6 are connected to the draft member 10 by means of connecting strap members 11 which are bolted to the beams and to the draft member 10. The implement is coupled to the tractor through a U-shaped draft frame 12 bolted to the under side of the tractor and extending rearwardly to laterally aligned horizontal pivots 13, by means of which the transverse draft member 10 is connected to the draft frame 12 for vertical swinging movement. The forward ends of the beams 5, 6 are prevented from twisting about their longitudinal axes by inwardly extending guide members 14 which engage the transversely extending draft member 10. Sufficient flexibility is provided by virtue of the connecting straps 11 between the forward ends of the beams and the draft member 10 to permit a substantial amount of independent vertical swinging of the beams 5, 6 relative to each other.

The depth of operation of each of the lister bottoms 8 is gauged by an individual gauge wheel 15 journaled at the end of a crank arm 16 which is swingably connected to its respective tool beam. Each of the gauge wheels 15 is adjustable vertically by means of a lever 17 acting through suitable linkage 18. The tool beams 5, 6 are simultaneously raised from the normal operating position indicated in Figure 2, to raised or transport position by conventional power lift mechanism 20 disposed at the rear of the axle housing 21 of the tractor and acting through a transverse rock shaft 22 at either end of which is clamped a lifting arm 23 having an extension 24. The rear end of each of the extension arms 24 is connected to one of the draft beams 5, 6, respectively, by means of vertically disposed links 25.

For a more complete description of a lister of the type indicated herein, reference may be had, if desired, to my co-pending application, Serial No. 747,261, filed October 8, 1934.

Coming now to that portion of the implement with which my invention is more directly concerned, the tool beams 5, 6 are interconnected by a transversely extending bracing member 30 disposed intermediate the ends of the beams. Each end of the bracing member 30 is supported on a bracket 31 affixed on the respective beam. The bracing member 30 is connected to the brackets 31 by pivot bolts 32 which are inserted through aligned apertures in the brackets and the bracing member. The bracing member is provided with a plurality of spaced apertures at each end for the purpose of making adjustments of the lateral spacing between the tool beams 5 and 6.

A second bracing member 35 is spaced rearwardly and downwardly from the above mentioned bracing member 30 and is connected adjacent opposite ends thereof to the tool carrying shanks 7 by means of brackets 36 which are bolted to the shanks 7 by bolts 37, each of the brackets having a laterally bent end portion 38 on which the bracing member is bolted by means of pivot bolts 39, inserted through one of a plurality of holes 40 at each end of the brace 35. The additional holes 40 are provided for the purpose of making adjustments in the lateral spacing of the beams 5 and 6. Since the bracing members 30 and 35 are pivotally connected by pivot bolts 32 and 39, respectively, for swinging movement in parallel vertical planes, it is clear that the beams 5, 6 can be independently swung vertically relative to the tractor and to each other. The rearward brace 35 is arched upwardly between its end connections to provide ample clearance above the earth turned by the ground working tools 8.

I claim:

1. In a tractor mounted implement, the combination of a pair of longitudinally extending tool carrying beams, a draft frame therefor, means for connecting said beams to said draft frame providing independent vertical swinging movement of said beams, and a pair of transversely extending bracing members connected between said beams and pivotally connected thereto to permit said independent vertical swinging thereof, said members being spaced both longitudinally and vertically relative to one another.

2. In an implement comprising a draft frame and a pair of laterally spaced tool carrying beams connected thereto for vertical swinging movement of said beams relative to said frame and to each other, said beams having vertically extending tool carrying shanks, a first transversely disposed bracing member pivotally connected adjacent opposite ends thereof to each of said tool carrying shanks, respectively, and a second transversely disposed bracing member pivotally connected adjacent opposite ends thereof to said tool carrying beams, respectively, at points spaced vertically and longitudinally of said first bracing member connections.

3. The combination with a tractor of a pair of parallel beams having downwardly extending ground working tool carrying shanks at the rear ends thereof disposed behind the tractor, said beams extending forwardly beneath said tractor, means for connecting the forward ends of said beams to said tractor providing independent vertical swinging of each of said beams relative to said tractor, a first transverse bracing member pivotally connected adjacent opposite ends thereof to each of said tool carrying shanks at points disposed beneath the planes of the adjacent portions of said beams for pivotal movement in a vertical plane, and a second transverse bracing member pivotally connected adjacent opposite ends thereof to said tool carrying beams at points spaced upwardly and forwardly of said first bracing member connections, for pivotal movement in a vertical plane.

4. In an implement comprising a draft frame and a pair of laterally spaced tool carrying beams connected thereto for vertical swinging movement of said beams relative to said frame and to each other, said beams having vertically extending tool carrying shanks, a first transversely disposed bracing member pivotally connected adjacent opposite ends thereof to each of said tool carrying shanks, respectively, and a second transversely disposed bracing member pivotally connected adjacen opposite ends thereof to said tool carrying beams, respectively, at points spaced vertically and longitudinally of said first bracing member connections, said transverse braces including means for adjusting the lateral spacing of said beams.

5. The combination with a tractor of a pair of parallel beams having downwardly extending ground working tool carrying shanks at the rear ends thereof disposed behind the tractor, said beams extending forwardly beneath said tractor, means for connecting the forward ends of said beams to said tractor providing independent vertical swinging of each of said beams relative to said tractor, and a transverse bracing member pivotally connected adjacent opposite ends thereof to each of said tool carrying shanks at points disposed beneath the planes of the adjacent portions of said beams for pivotal movement in a vertical plane.

6. In an implement comprising a draft frame and a pair of laterally spaced parallel beams connected thereto for vertical swinging movement of said beams relative to said frame and to each other, said beams having vertically extending tool carrying shanks, a pair of transversely extending bracing members spaced apart longitudinally relative to said beams, and means for pivotally connecting each of said members to each of said beams whereby said beams are free to rise and fall relative to one another but are braced to restrain either of said beams from bending out of parallelism with the other.

7. In an implement comprising a draft frame and a pair of laterally spaced parallel beams connected thereto for vertical swinging movement of said beams relative to said frame and to each other, said beams having vertically extending tool carrying shanks, a pair of transversely extending bracing members spaced apart vertically relative to said beams, and means for pivotally connecting each of said members to each of said beams for pivotal movement about axes disposed longitudinally relative to said beams, whereby said beams are free to rise and fall relative to one another but are braced to restrain either of said beams from twisting relative to the other.

8. In a tractor mounted implement, the combination of a pair of longitudinally extending tool carrying beams, a draft frame therefor, means for connecting said beams to said draft frame providing independent vertical swinging movement of said beams, and a pair of transversely extending bracing members connected between said beams and pivotally connected thereto to permit said independent vertical swinging thereof, said members being spaced both longitudinally and vertically relative to one another, at least one of said members being arched in a substantially vertical plane.

9. In an implement comprising a draft frame and a pair of laterally spaced tool carrying beams connected thereto for vertical swinging movement of said beams relative to said frame and to each other, said beams having vertically extending tool carrying shanks, a transversely disposed arched bracing member pivotally connected adjacent opposite ends thereof to each of said tool carrying shanks, respectively, and a second transversely disposed bracing member pivotally connected adjacent opposite ends thereof to said tool carrying beams, respectively, at points spaced vertically and longitudinally of said first bracing member connections.

10. In an implement comprising a draft frame and a pair of laterally spaced parallel beams connected thereto for vertical swinging movement of said beams relative to said frame and to each other, said beams having vertically extending tool carrying shanks, a pair of transversely extending bracing members spaced apart vertically relative to said beams, the lower one of said members being arched upwardly, and means for pivotally connecting each of said members to each of said beams for pivotal movement about axes disposed longitudinally relative to said beams, whereby said beams are free to rise and fall relative to one another but are braced to restrain either of said beams from twisting relative to the other.

WALTER H. SILVER.